United States Patent [19]

Loeffler

[11] Patent Number: 4,488,637
[45] Date of Patent: Dec. 18, 1984

[54] EGG CARRIER

[75] Inventor: Thomas V. Loeffler, Fenton, Mich.

[73] Assignee: Diamond Automations, Inc., Farmington Hills, Mich.

[21] Appl. No.: 394,430

[22] Filed: Jul. 1, 1982

[51] Int. Cl.³ .............................................. B65G 47/86
[52] U.S. Cl. .................................... 198/653; 198/694; 294/87 A; 294/116; 414/736
[58] Field of Search ............... 198/653, 694, 696, 479, 198/486, 650; 294/87 A, 87 R, 116; 414/416, 736, 751, 739, 744 A, 753

[56] References Cited

U.S. PATENT DOCUMENTS

| | | | |
|---|---|---|---|
| 2,213,774 | 9/1940 | Taylor | 198/653 X |
| 2,792,253 | 5/1957 | Bliss | |
| 2,948,564 | 8/1960 | Carkhuff | |
| 2,954,996 | 10/1960 | Carkhuff | |
| 3,224,580 | 12/1965 | Scollard et al. | |
| 3,300,027 | 1/1967 | Booij | |
| 3,511,367 | 5/1970 | Bliss | |
| 4,068,882 | 1/1978 | van der Schoot | |
| 4,155,466 | 5/1979 | Hogenesch | |

FOREIGN PATENT DOCUMENTS 2741581  3/1979  Fed. Rep. of Germany ...... 198/486

OTHER PUBLICATIONS

J. L. Sirico, "Gripper Mechanism", *IBM Technical Disclosure Bulletin*, vol. 17, No. 8, p. 2246, Jan. 1975.

Primary Examiner—Joseph E. Valenza
Assistant Examiner—Jonathan D. Holmes
Attorney, Agent, or Firm—Kenyon & Kenyon

[57] ABSTRACT

A carriage assembly for transporting two eggs in side-by-side relationship from one station to another such as from a weighing station in an egg grader to a packing station. A pair of oppositely disposed egg engaging members are pivotally mounted on fixed shafts positioned in a platform. The engaging members are curved to engage the egg upon closing of the members, the closing movement being controlled by means of a cam in engagement with the upper horizontal portion of each engaging member. Each of the cams in engagement with the horizontal portion of the engaging members, is mounted on a shaft disposed perpendicular to that of the fixed shafts. A spring member is mounted on the fixed shaft and urges the egg engaging member toward the open position. An actuating bar is fixed to and extends from the mounting shaft in order to rotate the cams into and out of engagement with the horizontally disposed upper portion of the egg engaging members thereby controlling their closing and opening movement.

16 Claims, 6 Drawing Figures

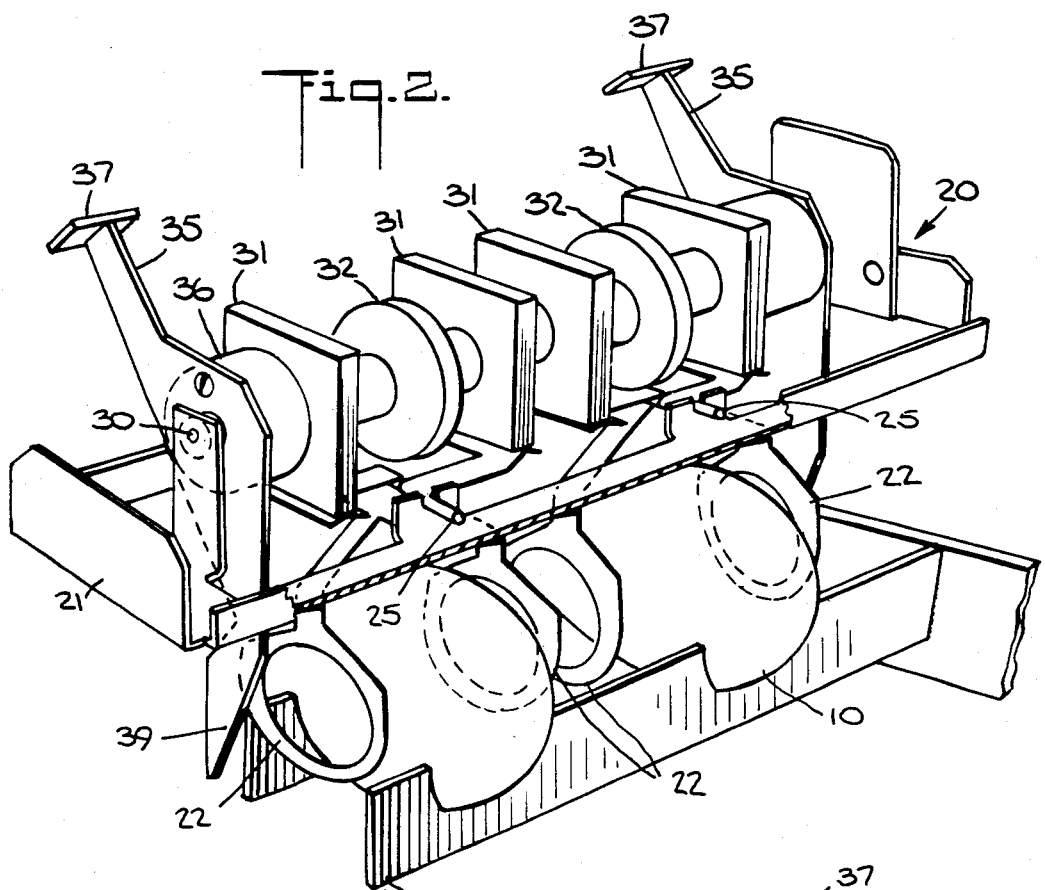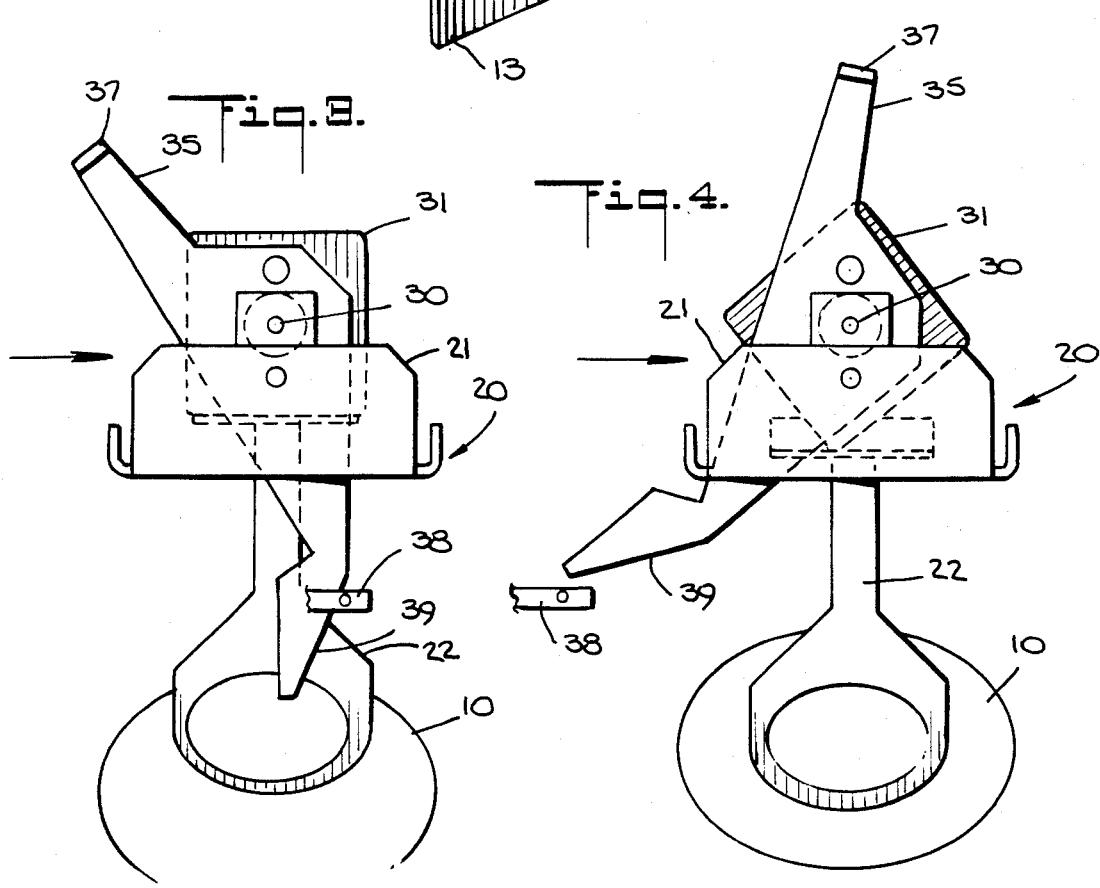

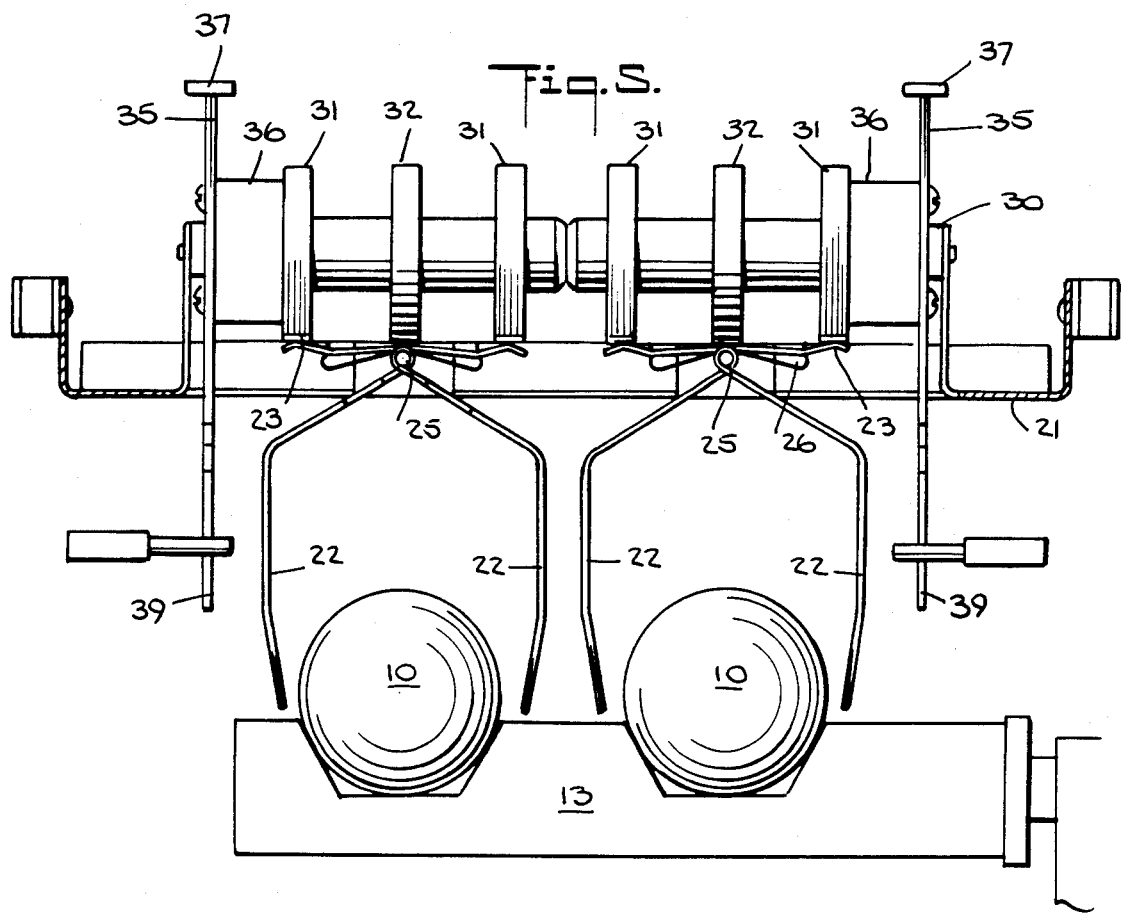
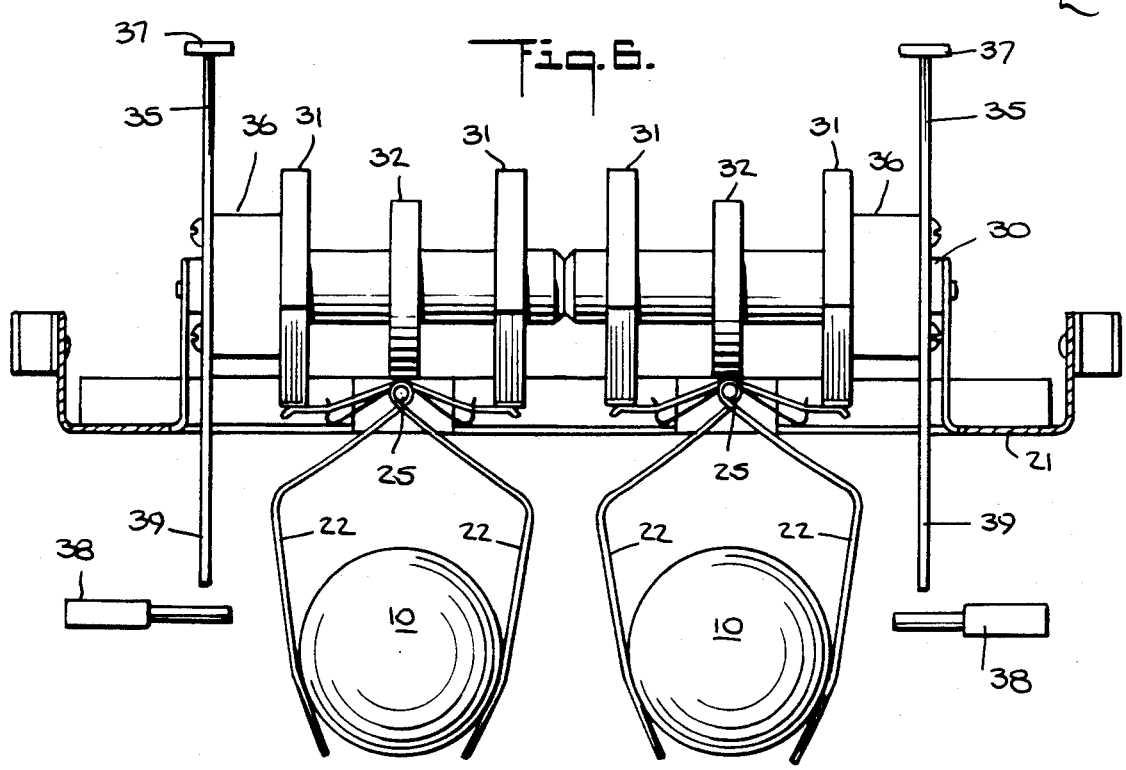

EGG CARRIER

BACKGROUND OF THE INVENTION

This invention relates generally to an egg carrier and in particular to one adapted to engage and carry an egg from one station to another.

During the processing of eggs, it is generally required to move the eggs individually from one processing station to another prior to packaging. One example is in an egg grader where after the eggs are weighed or graded, they must then be conveyed to a packing station at which the eggs are packaged in accordance with their particular grades. This is frequently done on conveyor belts and in some instances by means of egg engaging carrier members.

In a system of the type disclosed in the co-pending application entitled Egg Processing System, Ser. No. 394,162, filed July 1, 1982 it is particularly important to convey the eggs individually while maintaining an indication as to the position of the egg during movement. This is particularly important in that the individual characteristics of the egg, e.g. weight, defect, and the like are registered and recorded in the memory system and subsequently utilized in determining the appropriate packer for which the egg has been classified. In this system not only is it desirable that the eggs be carried individually but it is also highly desirable that the engagement or lifting of the egg from the weighing station is smooth and without any sudden movement of the engaging members. Once the egg is lifted, the engaging members must be of a type capable of effecting the proper gripping force without exerting any undue pressure on the shell of the egg, which force if excessive would result in breakage of the egg. An appropriate carrying force is particularly necessary in an egg grader of the type disclosed in Ser. No. 394,161, wherein the eggs are moved away from the weighing station at a high speed by means of a chain driven conveyor. Reference is further made to the copending application Ser. No. 394,443, filed July 1, 1982 in which the Egg Transfer System is particularly described.

By means disclosed herein, a carriage assembly is provided which serves as an effective means for positively carrying an egg from one processing station to another. Actuation and release of the egg engaging members is accomplished in a smooth manner without any sudden movement which thus satisfies the requirements in systems where an egg must be positively carried at a significantly high speed of operation.

SUMMARY OF THE INVENTION

Briefly stated, the apparatus of this invention is adapted to carry an article from one station to another and is provided with a platform on which a pair of oppositely disposed article engaging members are pivotally mounted. The article engaging members are movable with respect to one another so as to engage the article in the closed position and release the article when in the open position. The article engaging members have a downwardly depending portion engaging the article with the upper portion thereof being reversely bent such that a surface thereof assumes a substantially horizontal orientation. A support shaft is provided on the platform over which the bent portion of each of the engaging members is disposed so as to be pivotally movable with respect to one another. Opening and closing of the article engaging members is accomplished by a cam means in engagement with the horizontal surface of each of the engaging members in order to effect the pivotal movement thereof.

In a more specific embodiment of the invention, a carriage assembly is provided in the form of a platform having the plurality of support shafts mounted thereto. The number of support shafts provided is equal to the number of eggs to be transported. A pair of oppositely disposed egg engaging members, pivotally movable with respect to one another, are provided. In this manner, the engaging members are adapted to close upon and hold the egg in the closed position and release the egg when open. The engaging members are formed with a downwardly depending curved portion which engages the smaller width of the egg while the upper end thereof is reversely bent so as to provide a surface having a substantially horizontal orientation with the bent portion of each of the engaging members being disposed over the support shafts and pivotally movable with respect thereto. A resilient means in the form of a spring member is mounted on the support shaft in contact with the horizontal surface of the engaging means so as to urge the engaging means toward the open position. A mounting shaft is disposed on the platform generally perpendicular to the support shafts. Camming means are disposed on the mounting shaft in engagement with the horizontal surface of each of the engaging means to effect pivotal movement thereof. In this manner, the camming means regulates the opening and closing of the egg engaging means so as to effectively carry an egg from one station to another.

In a further embodiment of the invention, a movable bar is disposed on the mounting shaft, the top portion thereof extending above the platform with the lower portion extending through an aperture below the platform. Engagement with the lower portion of the bar causes the cam member to rotate and pivotally move the egg engaging means into the closed position Engagement of the upper portion of the bar causes the cam member to rotate in an opposite direction thereby opening the egg engaging means and releasing the egg. The portion of the platform adjacent the aperture serves as a stop to limit the movement of the rotatable bar thereby maintaining the egg engaging means in the closed position.

Accordingly, it is an object of this invention to provide an article carrying means suitable for engaging and carrying an article from one station to another.

It is another object of this invention to provide an apparatus which is capable of positively engaging and holding an egg being transported without any undue pressure which would otherwise cause breakage of the egg.

It is another object of this invention to provide an apparatus which is suitable for carrying a plurality of eggs in side-by-side relation while being moved at a relatively high speed from one station to another.

These and other objects, advantages and features of the invention will become more apparent from the following description taken in conjunction with the accompanying drawings.

BRIEF DESCRIPTION OF THE DRAWINGS

FIG. 2 is a perspective view of the egg carriage assembly of this invention with the holding members in the open position about to engage an egg;

FIG. 3 is a side elevation view of the egg carriage assembly in the open or egg releasing position;

FIG. 4 is a side elevation view of the egg carriage assembly in the closed or egg engaging position;

FIG. 5 is a front elevation view of the egg carriage assembly with the egg engaging members in the open position; and FIG. 6 is a front elevation view of the egg carriage assembly with the egg engaging members in the closed position.

BRIEF DESCRIPTION OF THE PREFERRED EMBODIMENT

Figure 1:
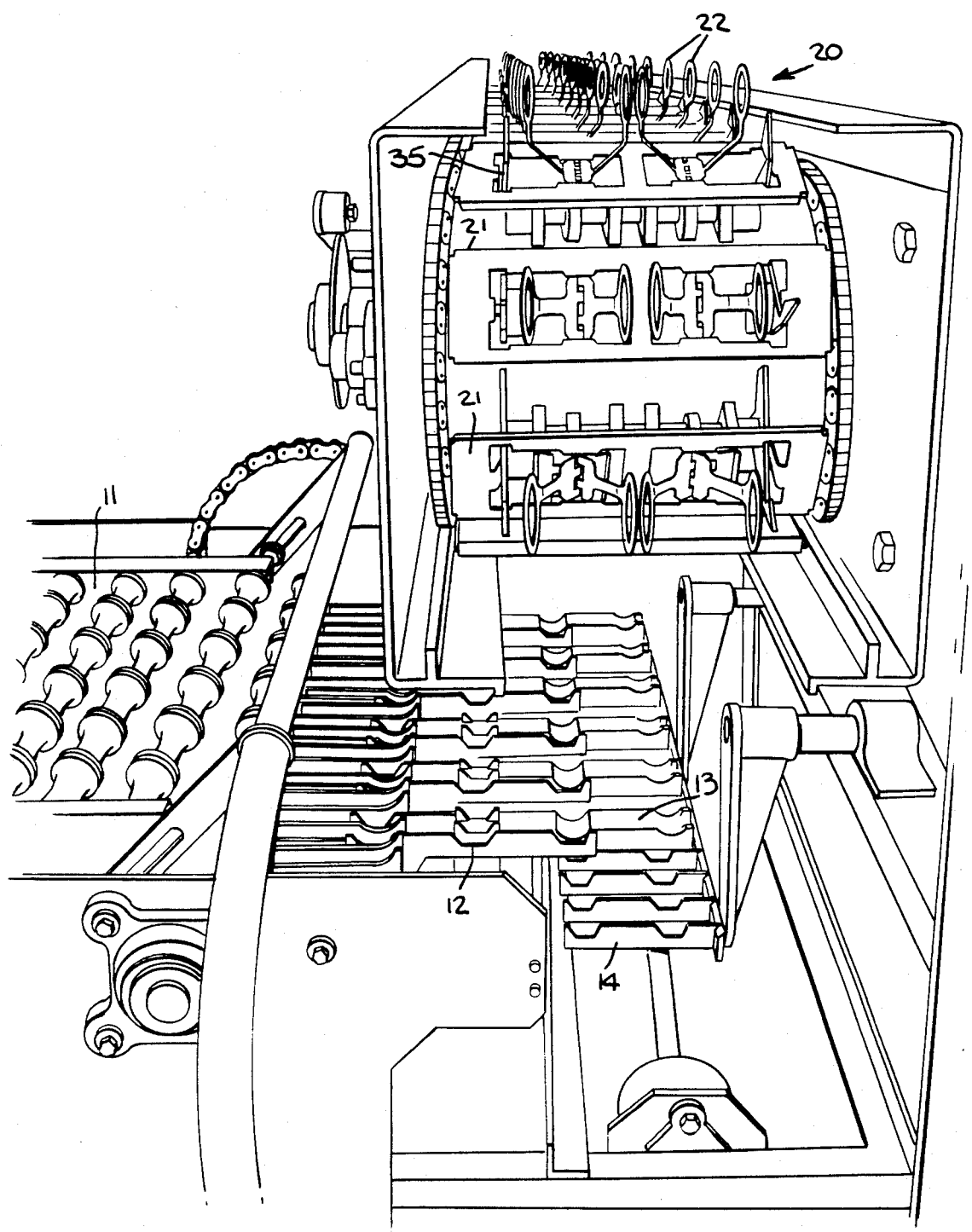
FIG. 1 is a perspective view of an egg grader employing the egg carriage assembly of this invention.

With reference to the drawings and particularly FIGS. 1 and 2, the egg carriage assembly 20 is illustrated as part of a grading system which is more fully described in the co-pending applications Ser. Nos. 394,162 and 394,161. In the egg grading system described in the co-pending application, eggs 10 are routed from the candling area 11 onto a weighing station 12. Once the grading is completed, the eggs are moved forward from weighing station 12 into a pickup station 13 at which they are lifted by the rotating arms 14. A pair of eggs are positioned at pickup station 13 and rotated upwardly therefrom by the lifting arms 14 and engaged by the carriage assembly 20 of this invention and transported to a series of adjacently spaced packers (not shown).

Carriage assembly 20 includes a sheet metal platform 21 which has mounted thereon a pair of depending prongs or egg engaging members 22. Prongs 22 are pivotally mounted and positioned opposite one another in order to engage an egg 10 therebetween across its smaller side or width. The lower portion of prong 22 is curved so as to approximate the curvature across the smaller width of the egg 10. The upper portion of prong 22 is reversely bent so as to provide a surface having a generally horizontal orientation at 23 (FIGS. 5 and 6). The bent portion of prong 22 is mounted on a fixed shaft 25 so as to be pivotally movable with respect thereto. The opposing prong 22 is similarly mounted over shaft 25 so that a pair of operative prongs 22 open and close with respect to one another in the manner described below. A spring member 26 is wound at one end thereof about fixed shaft 25 with the free end thereof in engagement with the generally horizontal portion of prong 22.

A fixed mounting shaft 30 is positioned on the platform 21 generally perpendicular with respect to the fixed support shafts 25. Cam members 31 have a generally square profile and are pivotally mounted on shaft 30 with the operative bottom flat surface being in engagement with horizontal surface 23 of egg engaging prong 22. An integral spacer 32 is disposed between adjacent cam members 31 in order to maintain the proper spacing and engagement of the horizontal cam engaging surface with the horizontal surface 23 of the egg engaging prong 22.

Coupled to each of the end cam members 31 is an extension bar 35 which is spaced from the end cam member 31 by integral spacer 36. Bar 35 is provided with an upper T-shaped portion 37 which is engagable with a solenoid actuated plunger in order to actuate the rotational movement thereof. Each bar 35 is thus fastened or directly coupled to the adjacent spacer 36, cam 31, intermediate spacer 32 and the adjacent cam 31. In this manner, each pair of egg engaging prongs 22 is operated independent of one another although mounted to a common shaft 30.

In operation, egg engaging prongs 22 are placed into an open position when passed adjacent the path of the rotating lifting arm 14. As the eggs are in a position coincident with the approximate center of prongs 22, a prong of a comb assembly 38 is positioned in the path of the lower surface 39 of extension bar 35. In this manner, each carriage assembly 20 arrives at the comb assembly 38 with bar 35 in the position depicted in FIG. 4. In operation and as explained in greater detail in application Ser. No. 394,162, a comb assembly 38 closes or latches prongs 22 on twelve eggs simultaneously. When a prong of comb assembly 38 engages lower surface 39 of extension bar 35 causing the same to rotate in a clockwise direction while rotating cam members 31 therewith. Cams 31 are rotated approximately 45° such that the angular or corner portion thereof downwardly depresses the horizontal surface 23 of the egg engaging prongs 22. The downward movement of the generally horizontal cam engaging surface 23 causes the lower egg engaging portion of prongs 22 to move inward with respect to one another and close into an engaging relationship with egg 10. In this manner, egg 10 is thus lifted from lifting arm 14 and conveyed to a packaging position downstream in the grader machine. When bar 35 is pivotally moved into the closed position illustrated in FIG. 4, the lower portion thereof engages platform 21 which in turn limits the rotational movement thereof.

Once the egg arrives above the appropriate packer, a separate actuating means engages the upper T-section 37 of extension bar 35 causing the same to move in a counterclockwise direction thereby releasing egg 10 from the carriage assembly 20. In this respect, a solenoid actuated plunger is moved into the path of the carriage assembly so that the lower end thereof engages the top portion of T-section 37. Thus, counterclockwise rotation of bar 35 from the position depicted in FIG. 4 to that depicted in FIG. 3 causes the prongs 22 to pivot outwardly with respect to one another due to the force exerted by spring member 26 which urges prongs 22 toward the open position.

Thus, by the means disclosed herein, an egg carriage assembly is provided which is adapted to engage and close upon an egg to be transported from one station to another while positively retaining the egg being conveyed. The egg is firmly gripped across its smaller width without excessive pressure by means of the carriage assembly which is capable of being moved at a relatively high speed. While in the described embodiment the egg is gripped and conveyed with a horizontal orientation, it is noted that the egg could be engaged with a vertical orientation and if desired with its pointed end facing downward for direct packing into a carton or tray. The apparatus is further designed to facilitate releasing the egg at a predetermined position in accordance with the particular characteristics of the egg being transported.

Although the above description is directed to a preferred embodiment of the invention, it is noted that other variations and modifications will be apparent to those skilled in the art, and, therefore, may be made without departing from the spirit and scope of the present disclosure.

What is claimed is:

1. An apparatus suitable for engaging an article to be carried from a first station to a second station which comprises,
   a platform movable between the first and second stations,
   a pair of oppositely disposed article engaging members coupled to said platform and adapted for grasping the article at the first station and for releasing the article at the second station, said article engaging members being pivotally movable with respect to one another so as to engage the article in the closed position and release the article in the open position, said engaging members having a downwardly depending portion for engaging the article to be carried with the upper end thereof being reversely bent and having a surface thereof in a substantially horizontal orientation,
   a support shaft mounted on said platform over which the bent portion of each of said engaging members is disposed so as to be pivotally movable with respect to one another,
   a cam means disposed above said platform in engagement with the horizontal surface of each of said engaging members to effect a pivotal movement thereof and further comprising a mounting shaft disposed generally perpendicular to said support shaft upon which said cam means is mounted, a spacer member disposed on said mounting shaft for connecting each of said cam means disposed over the respective article engaging member to effect simultaneous movement thereof, and
   a movable bar member rotatably mounted on said mounting shaft and being coupled to said cam means so that when said bar member is engaged and rotated said cam means is rotated therewith so as to actuate the opening and closing of said article engaging members.

2. The apparatus of claim 1 which further includes a resilient means mounted on said support shaft in engagement with said horizontal surface of said engaging members so as to urge said engaging members toward the open position.

3. The apparatus of claim 1 wherein said bar member includes a top portion extending above said platform which when actuated opens said article engaging members thereby releasing the article being carried and a lower portion which when actuated pivotally moves said cam means so as to close said article engaging members on the article to be carried.

4. The apparatus of claim 3 wherein said platform has an aperture therein through which said article engaging members and the lower portion of said bar extend, one side of said aperture being engagable with the lower portion of said bar so as to provide a stop to restrict the movement thereof.

5. A carriage assembly for transporting a plurality of eggs from one station to another which comprises,
   a platform movable between the first and second stations,
   a plurality of support shafts mounted on said platform equal to the number of eggs to be transported,
   a pair of oppositely disposed egg engaging members for each of the eggs to be transferred and being pivotally movable with respect to one another so as to engage the egg in the closed position at said first station and release the egg in the open position at said second station, each of said engaging members having a downwardly depending curved portion for engaging the smaller width of the egg with the upper end thereof being reversely bent and having a surface thereof in a substantially horizontal orientation with the bent portion of each of said engaging members being disposed over said support shafts so as to be pivotally movable with respect thereto,
   resilient means mounted on said support shaft and in engagement with said horizontal surface of each of said engaging members so as to urge said engaging members toward the open position,
   a mounting shaft positioned on said platform and being disposed generally perpendicular to said support shafts,
   cam means disposed on said mounting shaft in engagement with the horizontal surface of each of said engaging members to effect pivotal movement thereof thereby causing said engaging members to engage and hold the egg in the closed position, and
   a movable bar member rotatably mounted on said mounting shaft and being coupled to said cam means so that when said bar member is engaged and rotated said cam means is rotated therewith so as to actuate the opening and closing of said egg engaging members.

6. The apparatus of claim 5 wherein said movable bar member includes a top portion extending above said platform which when actuated opens said egg engaging members thereby releasing the egg being carried and a lower portion which when actuated pivotally moves said cam means so as to close said egg engaging members on the egg to be carried.

7. The apparatus of claim 6 wherein said platform has an aperture therein for each pair of egg engaging members through which said engaging members and the lower portion of said movable bar extend, one side of said aperture being engagable with the lower portion of said bar so as to provide a stop to restrict the movement thereof.

8. An apparatus suitable for engaging an article to be carried from a first station to a second station which comprises,
   a platform movable between the first and second stations,
   a pair of oppositely disposed article engaging members coupled to said platform and adapted for grasping the article from the first station and for releasing the article at the second station, said article engaging members being pivotally movable with respect to one another so as to engage the article in the closed position and release the article in the open position, said engaging members having a downwardly depending portion for engaging the article to be carried and having an upper surface thereof in a substantially horizontal orientation,
   a support shaft mounted on said platform on which said engaging members are disposed so as to be pivotally movable with respect to one another,
   a cam means disposed above said platform in engagement with the upper surface of each of said engaging members to effect a pivotal movement thereof, and further comprising a mounting shaft disposed generally perpendicular to said support shaft upon which said cam means is mounted, a spacer member disposed on said mounting shaft for connecting each of said cam means disposed over the respective article engaging member to effect simultaneous movement thereof, and a movable bar member rotatably mounted on said mounting shaft and being coupled to said cam means so that when said bar member is engaged and rotated said cam means is rotated therewith so as to acutate the opening and closing of said article engaging members.

9. The apparatus of claim 8 which further includes a resilient means mounted on said support shaft in engagement with said upper surface of said engaging members so as to urge said engaging members toward the open position.

10. The apparatus of claim 8 wherein said bar member includes a top portion extending above said platform which when actuated opens said article engaging members thereby releasing the article being carried and a lower portion which when actuated pivotally moves said cam means so as to close said article engaging members on the article to be carried.

11. The apparatus of claim 10 wherein said platform has an aperture therein through which said article engaging members and the lower portion of said bar extend, one side of said aperture being engagable with the lower portion of said bar so as to provide a stop to restrict the movement thereof.

12. The apparatus of claim 8, wherein said article engaging members resiliently engage the article to be carried.

13. A carriage assembly for transporting a plurality of eggs from one station to another which comprises,
a platform movable between the first and second stations,
a plurality of support shafts mounted on said platform equal to the number of eggs to be transported,
a pair of oppositely disposed egg engaging members for each of the eggs to be transferred and being pivotally movable with respect to one another so as to engage the egg in the closed position at said first station and release the egg in the open position at said second station, each of said engaging members having a downwardly depending curved portion for engaging the egg and having an upper surface thereof in a substantially horizontal orientation, said engaging members being pivotally movable on said support shafts,
resilient means mounted on said support shaft and in engagement with said upper surface of each of said engaging members so as to urge said engaging members toward the open position,
a mounting shaft positioned on said platform and being disposed generally perpendicular to said support shafts,
cam means disposed on said mounting shaft in engagement with the upper surface of each of said engaging members to effect pivotal movement thereof thereby causing said engaging members to engage and hold the egg in the closed position, and
a movable bar member rotatably mounted on said mounting shaft and being coupled to said cam means so that when said bar member is engaged and rotated said cam means is rotated therewith so as to actuate the opening and closing of said egg engaging members.

14. The apparatus of claim 13 wherein said movable bar member includes a top portion extending above said platform which when actuated opens said egg engaging members thereby releasing the egg being carried and a lower portion which when actuated pivotally moves said cam means so as to close said egg engaging members on the egg to be carried.

15. The apparatus of claim 14 wherein said platform has an aperture therein for each pair of egg engaging members through which said engaging members and the lower portion of said movable bar extend, one side of said aperture being engagable with the lower portion of said bar so as to provide a stop to restrict the movement thereof.

16. The apparatus of claim 13, wherein said egg engaging members resiliently engage the egg to be carried.

* * * * *